Figure 1:
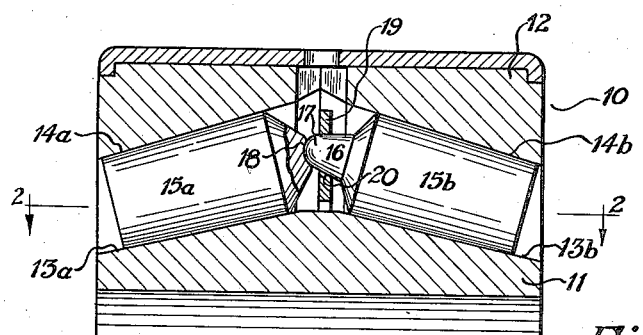

Nov. 1, 1932. N. MEDVED 1,885,852
DOUBLE THRUST ROLLER BEARING
Filed Aug. 13, 1929

Inventor
Nicholas Medved
By Harry Frease
Attorney

Patented Nov. 1, 1932

1,885,852

UNITED STATES PATENT OFFICE

NICHOLAS MEDVED, OF CANTON, OHIO

DOUBLE THRUST ROLLER BEARING

Application filed August 13, 1929. Serial No. 385,514.

My invention relates to roller bearings including an inner raceway sleeve, an outer raceway sleeve, two or more raceways on each sleeve, and two or more sets of rollers including two sets of tapered rollers, interposed between the sleeves, each set being interposed between a set of the opposite raceways. The inner raceway sleeves are usually called cones, and the outer raceway sleeves are usually called cups.

In such roller bearings, operating difficulties have been encountered in absorbing direct and component thrust loads, there being a tendency for the ends of rollers subject to the thrust loads to be destroyed by excessive friction between the roller ends and the usual shoulders applied on the cones to absorb the thrust of the tapered rollers.

The present improvements include a continuation in part of common subject matter of the improvements set forth in my application for patent for roller bearings, Serial No. 257,190, filed February 27, 1928.

A principal object of the present improvements includes the provision of a roller bearing employing tapered rollers and adapted to resist thrust loads from either direction, and in which there is a substantial reduction in the friction resulting from the operation of the same, and more particularly from the friction resulting from direct and component thrust loads.

A further object of the present improvements includes the provision of a double thrust roller bearing, including novel means for transmitting the thrust load from one set of rollers to another set.

A further object of the present improvements includes the provision of a roller bearing, the parts of which are adapted for easy and economical manufacture and assembly.

These and ancillary objects are attained by the present invention, as is hereinafter claimed, and several embodiments of which are hereinafter set forth in detail, and the invention may be stated in general terms as including a roller bearing comprising an inner sleeve having a plurality of outer raceway surfaces, an outer sleeve having a plurality of inner raceway surfaces, and two sets of oppositely tapered rollers, each set being interposed between and rolling on opposite raceway surfaces of the sleeves, each raceway surface being limited to a conical surface, and means independent of the cone and cup permitting rotation of the rollers and maintaining their circumferential and longitudinal axial positions with respect to each other and including improved interfitting means on the sets of rollers for transmitting thrust loads from one set to the other set; and the present invention also includes improvements in the details of construction and arrangement of roller bearing parts, as hereinafter exemplified.

Figure 3:
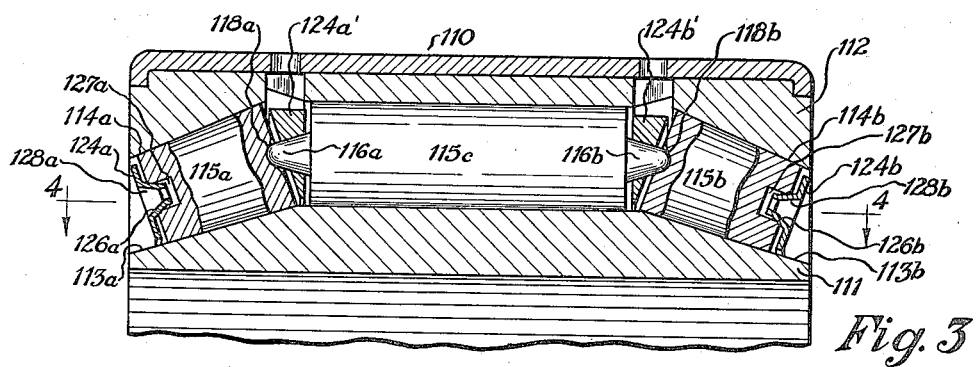
Figures 2, 4:
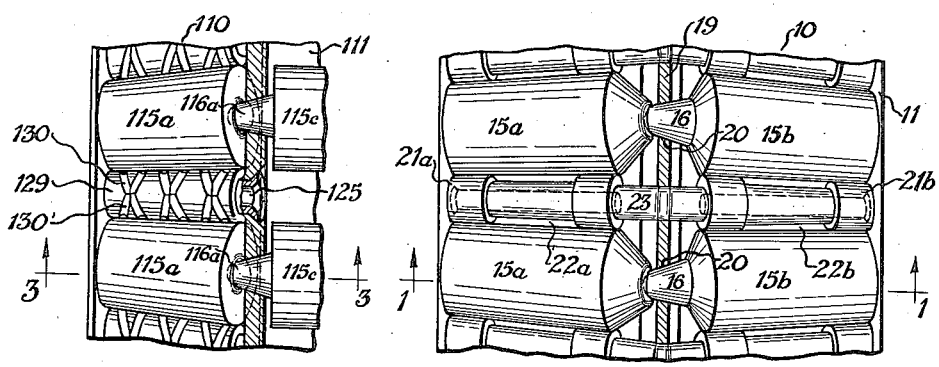

Preferred embodiments of the present improvements are illustrated in the accompanying drawing forming part hereof, in which Figure 1 is a fragmentary cross section of one form of roller bearing embodying the improvements as on line 1—1, Fig. 2;

Fig. 2, a fragmentary view thereof as in the direction of the arrows 2—2, Fig. 1;

Fig. 3, a view similar to Fig. 1 of another form of roller bearing embodying the improvements, as on line 3—3, Fig. 4; and Fig. 4, a fragmentary view thereof as in the direction of the arrows 4—4, Fig. 3.

Similar numerals refer to similar parts throughout the several views.

Two forms of roller bearings embodying the present improvements are indicated generally at 10 and 110, respectively, in Figs. 1 and 2, and in Figs. 3 and 4.

The roller bearings 10 and 110, include respectively inner sleeves 11 and 111, and outer sleeves 12 and 112. The inner sleeves 11 and 111 are each provided, respectively, with oppositely tapered outer conical raceway surfaces 13a and 13b, and 113a and 113b; and the outer sleeves 12 and 112 are provided, respectively, with oppositely tapered inner conical raceway surfaces 14a and 14b, and 114a and 114b.

Each of the raceway surfaces is preferably limited solely to a conical surface and does not include any projecting shoulder or flange, which has heretofore been customary to provide on the sleeves of tapered roller bearings for preventing longitudinal axial displacement of the rollers with respect to each other, and for transmitting the thrust loads from one sleeve to the other.

Sets of tapered rollers 15a and 15b, are interposed and roll respectively between the sets of opposed raceway surfaces 13a and 14a, and 13b and 14b; and similarly, sets of tapered rollers 115a and 115b are interposed and roll respectively between the sets of opposed raceway surfaces 113a and 114a, and 113b and 114b.

Means independent of the cone and cup are provided in each of the bearings 10 and 110, for maintaining the circumferential positions with respect to each other, and the longitudinal axial positions with respect to each other of the rollers 15a and 15b, and 115a and 115b, respectively, the positioning means at the same time permitting rotation of the rollers about their longitudinal axes, and transmitting thrust loads tending to displace one set of rollers with respect to its raceway surfaces, to the other set of rollers, and thence to its raceway surfaces.

Consequently in each bearing, uniform rolling in the raceways of all the circumferentially spaced rollers is attained, and since the circumferential positions with respect to each other and the longitudinal axial positions with respect to each other of the rollers of each bearing is maintained, no movement of either set of rollers axially of its conical raceway surfaces is possible.

Any forces tending to cause axial movement of one set of rollers with respect to its conical raceway surfaces is absorbed by reactions through the other set of rollers and its raceway surfaces.

Consequently since substantially no axial movement of either set of rollers in either direction is possible, no shoulders are required on the sleeves for resisting such axial movements.

In usual types of roller bearings including a cone and cup, and tapered rollers, a cage is provided for circumferentially spacing the several rollers with respect to each other; but slight circumferential and axial displacements of the several rollers with respect to each other is possibly due to the clearances between the cage and the rollers, and it has always been deemed to be necessary to provide a protruding shoulder on the cone or cup in order to control the longitudinal axial position of the rollers with respect to each other and the cone and cup.

In certain instances a cone without a shoulder has been used in combination with rollers whose circumferential spacing with respect to each other has been fixed, but no means have been provided for preventing longitudinal axial movement of such rollers with respect to each other and to the cone. Consequently surfaces of the rollers and of the circumferential positioning means or cage have been damaged, by reason of the relative longitudinal axial movement of the rollers with respect to the cage.

As aforesaid, the bearing positioning and thrust transmitting means of the present invention overcomes these difficulties and provides a more efficient and durable bearing at less cost.

Two forms of the positioning and thrust transmitting means are illustrated in the bearings 10 and 110.

In the roller bearing 10, a protuberance 16 preferably having a spherical extremity 17 is provided on the inner end of each of the rolls 15b, and each spherical extremity extends into and fits in a preferably spherical socket 18 formed in the inner end of each of the opposite rollers 15a. For attaining clearance, the inner end of each roller 15a is conical in shape as illustrated, the conical taper being opposite to that of the taper of the roller.

For circumferentially spacing the inner ends of both sets of rollers, a central ring 19 is located between the inner ends of the rollers, and has circumferentially spaced apertures 20 formed therein, through each of which one of the protuberances 16 extends; the spherical or ball and socket engagement of the protuberances 16 and the sockets 18 being on one side of the ring 19, and the body of the rollers 15b being on the other side.

For providing further circumferential spacing means, spacer rollers 21a and 21b are located between the rollers 15a and 15b, respectively, and the taper rollers are preferably enlarged at their outer ends as illustrated, and the enlarged outer ends provide the rolling contact between the tapered rollers, and lubricating channels 22a and 22b are formed intermediate the enlarged outer ends of the spacer rollers.

The spacer rollers may be either tapered or cylindric as the design requires, and it is preferable to mount each opposite set of spacer rollers 21a and 21b upon the opposite end portions of a guide shaft 23, which passes through a suitable aperture or notch in the central ring 19.

Thus any force tending to displace either of the sets of rollers towards the other set, is transmitted through the ball and socket engagement to the other set and thence by wedge action to the raceways of the other set.

In the roller bearing 110, strong rigid rings 124a and 124a′, and 124b and 124b′ are interposed between but do not touch the bearing raceways at the opposite ends of the rollers 115a, and 115b, respectively; and axially extending members 125 rigidly connect each set of spaced rings at opposite ends of the rollers, and the axially extending members and each set of rings form strong rigid cages.

At the outer ends of each of the rollers 115a and 115b, respectively, conical sockets 126a and 126b are formed coaxial with the respective rollers, and are provided at their inner ends with counterbored extension sockets 127a and 127b, respectively, for retaining lubricant.

Conical centers 128a and 128b are formed in the rings 124a and 124b, respectively, and extend inwardly into and fit the sockets 126a and 126b, respectively.

The roller bearing 110 also includes a set of cylindric rollers 115c located between the inner ends of the oppositely tapered rollers 115a and 115b, and the cylindric rollers roll between cylindric raceways formed in the outer surfaces of the inner and outer sleeves 111 and 112, respectively; and this bearing is thus adapted for resisting thrust loads from either direction, as well as a large radial load.

Conical protuberances 116a and 116b extend outwardly from opposite ends of each cylindric roller 115c into and through a preferably conical aperture in the adjacent rings 124a' and 124b', respectively, and into and in abutment with sockets 118a and 118b formed respectively in the inner ends of the rollers 115a and 115b.

The outer ends of the protuberances and the sockets preferably include surfaces of interfitting spheres, and thus form ball and socket joints.

The rollers 115a are thus mounted for rotation between the rigidly positioned centers 128a and the protuberances 116a; and similarly the rollers 115b are mounted for rotation between the rigidly positioned centers 128b and the protuberances 116b.

For further strengthening the circumferential spacing for the rollers 115a and 115b, respectively, tubular spacer rollers 129 may be mounted for rotation upon the members 125, and the spacing rollers 129 are preferably provided with oppositely pitched helical oil grooves 130 and 130' by which oil may be moved from opposite ends of the rollers towards their central portions.

Any load tending to displace either set of tapered roller toward the other set is accordingly transmitted through the intervening cylindric rolls and protuberances to the other set and thence to its raceways by the wedge action of the other set of rollers.

I claim:

1. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, the raceway surfaces of each set converging outwardly a set of tapered rollers interposed between each set of raceway surfaces and rolling thereon, each raceway surface being limited to a conical surface, and the inner axial end of each roller in one set being in the form of a flat pitched cone, terminating in a steeply tapered thrust transmitting protuberance projecting axially therefrom, and a socket in each roller of the other set receiving and fitting one of the protuberances.

2. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a thrust transmitting conical protuberance having a rounded extremity extending from each roller of one set, and a rounded socket in each roller of the other set receiving and fitting one of the conical protuberances.

3. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting conical protuberance formed integrally with each roller of one set and projecting axially therefrom, and a socket in each roller of the other set receiving and fitting one of the protuberances.

4. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting tapered protuberance having a rounded extremity, formed integrally with and extending from each roller of one set, and a rounded socket in each roller of the other set receiving and fitting the outwardly projecting end portion of said protuberances.

5. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a reduced end portion projecting axially from each roller of one set, and forming a unitary part thereof said end portion tapering to a rounded extremity a socket in each roller of the other set receiving the outer end of said reduced portion, and means receiving said reduced portion for circumferentially spacing the said rollers.

6. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a thrust transmitting conical protuberance terminating in a rounded extremity formed integrally with and extending from each roller of one set, and a socket in each roller of the other set, a spacing ring having a circumferentially extending series of spaced openings, said protuberances positioned through said openings and projecting beyond the said ring with the outer end portion of each protuberance seated in the socket of one of said rollers of the other set.

7. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting protuberance extending from each roller of one set, and a socket in each roller of the other set receiving one of the protuberances, and a ring having openings through which the protuberances project for circumferentially spacing said rollers.

8. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting conical protuberance extending from each roller of one set, and an axial socket in each roller of the other set receiving the end portion of said protuberances, a ring having a circumferentially extending series of openings, each protuberance projecting through one of the openings and being seated in one of said sockets for circumferentially spacing said rollers.

9. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a thrust transmitting tapered protuberance formed integrally with and projecting axially from each roller of one set, and a socket in each roller of the other set, a ring between the sets of rollers, said ring having a circumferentially extending series of tapered bores adapted to receive said protuberances which are entered therein and project beyond the other side of the ring, the outwardly projecting end of each protuberance being received in one of said sockets and spacer rollers operatively mounted and rolling between the tapered rollers.

10. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a unitary tapered hub projecting axially from each roller of one set said hub terminating in a rounded extremity, and a rounded socket in each roller of the other set receiving the end portion of said hub, and spacer rollers operatively mounted and rolling between the tapered rollers.

11. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting protuberance forming a unitary part of and extending axially from each roller of one set, and a socket in each roller of the other set a ring having a circumferentially extending series of spaced laterally directed apertures, each protuberance entered in one of said apertures and projecting from the other side of said ring, the end portion of each protuberance seated in one of said sockets, spacer rollers operatively mounted and rolling between the tapered rollers, and guide shafts mounted on said ring and projecting from each lateral side thereof, said spacer rollers mounted on said shafts.

12. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting tapered protuberance extending from each roller of one set, and a socket in each roller of the other set receiving and fitting the end portion one of the protuberances, and spacer rollers operatively mounted and rolling between the tapered rollers.

13. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a conical thrust transmitting protuberance extending from each roller of one set, and a socket in each roller of the other set a ring having openings therein for receiving said protuberances which project beyond said ring and are entered in the sockets of said rollers, shafts projecting laterally from each side of said ring at points between said tapered rollers, a spacer roller rotatably mounted on each shaft, each spacer roller contacting with two of said tapered rollers.

14. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of oppositely disposed, outwardly converging raceway surfaces, a set of outwardly tapered rollers interposed between each set of raceway surfaces and rolling thereon, the inwardly presented end of each roller being in the form of a flat cone, the conical end surface of one set of rollers terminating in a sharply tapered thrust transmitting protuberance, and a socket in the conical end of each roller of the other set receiving the end portion of one of said protuberances, a ring for circumferentially spacing the protuberances, and spacer rollers operatively mounted and rolling between the tapered rollers.

15. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, the opposite raceway surfaces of each set disposed in outwardly converging relation, a set of outwardly tapered rollers interposed between each set of raceway surfaces and rolling thereon, and a thrust transmitting protuberance extending from each roller of one set, and a socket in each roller of the other set receiving and fitting one of the protuberances, a ring member located between the inner ends of the rollers of the opposite sets, and there being circumferentially spaced apertures formed in the ring member, and the protuberances extending through the apertures.

16. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, each raceway surface being limited to a conical surface, and a tapered thrust transmitting protuberance terminating in a rounded extremity extending from each roller of one set, and a rounded socket in each roller of the other set receiving and fitting the rounded end portion of each of said protuberances, a ring member located between the inner ends of the rollers of the opposite sets, and there being circumferentially spaced apertures formed in the ring member, and the protuberances extending through the apertures.

17. A roller bearing including an inner sleeve having a pair of oppositely tapered conical raceway surfaces and the bases of the conical surfaces being adjacent each other, an outer sleeve having a pair of oppositely tapered conical raceway surfaces and the bases of the conical surfaces being adjacent each other, the raceway surfaces of the inner and outer sleeves forming two sets of opposite raceway surfaces, a set of tapered rollers interposed between each set of raceway surfaces and rolling thereon, and a thrust transmitting protuberance extending from each roller of one set, and a socket in each roller of the other set receiving and fitting one of the protuberances, a ring member located between the inner ends of the rollers of the opposite sets, and there being circumferentially spaced apertures formed in the ring member, and the protuberances extending through the apertures.

In testimony that I claim the above, I have hereunto subscribed my name.

NICHOLAS MEDVED.